US007395676B2

(12) United States Patent  
White

(10) Patent No.: US 7,395,676 B2
(45) Date of Patent: Jul. 8, 2008

(54) COLLAPSIBLE MISTING FAN APPARATUS

(76) Inventor: Steve White, 4375 Bayside Rd., Orono, MN (US) 55359

( * ) Notice: Subject to any disclaimer, the term of this patent is extended or adjusted under 35 U.S.C. 154(b) by 434 days.

(21) Appl. No.: 10/915,623

(22) Filed: Aug. 10, 2004

(65) Prior Publication Data
US 2006/0032259 A1 Feb. 16, 2006

(51) Int. Cl.
F28D 5/00 (2006.01)
(52) U.S. Cl. .................. 62/310; 62/314; 62/457.7; 261/151; 261/28; 261/116
(58) Field of Classification Search ................. 416/244, 416/246, 247 R, 170 R; 415/213.1, 126; 417/199.1, 234, 239, 361, 411, 423.15; 62/3.61, 62/240, 244, 259.4, 304, 306, 309, 310, 312, 62/314, 420, 457.7; D23/328; 261/24, 28, 261/30, 102, 151, 116, DIG. 3; 229/404; 440/72; 454/209; 165/60; 128/204.16; 239/290
See application file for complete search history.

(56) References Cited

U.S. PATENT DOCUMENTS

| 2,017,431 | A | 10/1935 | Anderson et al. |
| 2,259,853 | A | 10/1941 | Kock |
| D153,542 | S | 4/1949 | Owens et al. |
| 2,476,692 | A | 7/1949 | Bernstein |
| 2,617,583 | A | 11/1952 | Kemler |
| 2,624,504 | A | 1/1953 | Viewegh |
| 2,656,974 | A | 10/1953 | Holstein |
| 2,715,495 | A | 8/1955 | Se Bastian |
| 2,728,519 | A | 12/1955 | McLarty |
| 2,829,819 | A | 4/1958 | Corwin |
| 2,862,657 | A | 12/1958 | Copeland et al. |
| 3,081,690 | A | 3/1963 | Gesmar |
| 3,262,638 | A | 7/1966 | Militello |
| 3,307,469 | A | 3/1967 | Bohanon |
| 3,347,452 | A | 10/1967 | Radcliffe |
| 3,392,655 | A | 7/1968 | Chambers et al. |
| 3,787,142 | A | 1/1974 | Dupke |
| 3,791,333 | A | 2/1974 | Losch |
| 3,961,496 | A * | 6/1976 | Ku ............................... 62/459 |
| 3,963,382 | A | 6/1976 | Patton |
| 4,022,548 | A | 5/1977 | McLarty |
| 4,222,318 | A | 9/1980 | Patton et al. |

(Continued)

FOREIGN PATENT DOCUMENTS

GB 430480 6/1935

OTHER PUBLICATIONS

Packaging, Can A, bottom left side of page, Sep. 1985.

(Continued)

Primary Examiner—William E Tapolcai
(74) Attorney, Agent, or Firm—Gerald E. Helget; Nelson R. Capes; Briggs and Morgan, P.A.

(57) ABSTRACT

A portable, evaporative cooling apparatus includes a cabinet for storing cooling water, a water pump, a fan, and a spraying system. The fan is mountable on the cabinet lid and is removable from the cabinet lid for storage within the cabinet. The cabinet has wheels that allow it to be rolled along a surface and a handle for pulling the cabinet along the surface. The apparatus may be retrofit to a standard food cooler.

18 Claims, 4 Drawing Sheets

U.S. PATENT DOCUMENTS

| | | | |
|---|---|---|---|
| 4,443,965 A | 4/1984 | Gie | |
| 4,657,485 A | 4/1987 | Hartwig | |
| 4,818,183 A | 4/1989 | Schaefer | |
| 4,834,615 A | 5/1989 | Mauch et al. | |
| 4,981,214 A | 1/1991 | Rojas | |
| 5,088,388 A | 2/1992 | Schaefer | |
| 5,295,811 A | 3/1994 | Chiu | |
| 5,647,499 A | 7/1997 | Piazza | |
| D386,572 S | 11/1997 | Radtke et al. | |
| 5,685,165 A * | 11/1997 | Bigelow, Jr. | 62/420 |
| 5,715,698 A * | 2/1998 | Calton | 62/309 |
| 6,112,538 A | 9/2000 | Strussion | |
| D434,840 S | 12/2000 | Schaefer | |
| 6,182,463 B1 | 2/2001 | Strussion et al. | |
| D440,288 S | 4/2001 | Schaefer | |
| D443,053 S | 5/2001 | Schaefer | |
| 6,237,896 B1 * | 5/2001 | Hicks et al. | 261/28 |
| 6,257,502 B1 * | 7/2001 | Hanish et al. | 239/290 |
| 6,272,874 B1 * | 8/2001 | Keeney | 62/240 |
| 6,336,341 B1 * | 1/2002 | McGraw et al. | 62/420 |
| 6,367,278 B1 * | 4/2002 | Strussion et al. | 62/314 |
| D457,613 S | 5/2002 | Schaefer | |
| 6,401,483 B1 * | 6/2002 | Kopp | 62/420 |
| 6,471,194 B2 * | 10/2002 | Keeney | 261/30 |
| 6,503,063 B1 * | 1/2003 | Brunsell | 417/234 |
| 6,755,396 B1 * | 6/2004 | Weinrich | 261/30 |
| 6,786,701 B1 * | 9/2004 | Huang et al. | 417/199.1 |
| 6,789,787 B2 * | 9/2004 | Stutts | 261/28 |

OTHER PUBLICATIONS

Packaging, Can B, top right side of page, Sep. 1987.
Catalog supplement, "Agro-Power Funnel Fans".
Catalog supplement, "Agro-Power Fans".
Catalog supplement, "Agri-Aide Ventilation".
Catalog supplement, "Loyal Funnel Fans", p. 39.
Catalog supplement, "Circ-o-later II".
Catalog supplement, "Mini-Brute Ventilation Fans".
Catalog supplement, "24-Inch Super-Jet Circulation Fan".
Catalog supplement, "The Total Ventilation System".
Catalog supplement, "Flushmount Fan Installation Directions".
Dayton Electric Mfg. Co., "Dayton Greenhouse Circulator", Operating Instructions & Parts Manual, USA.
Catalog Supplement, Schaefer Ventilation Equipment, "Flush-Mount Exhaust Fans".
Schaefer Ventilation Equipment, Catalog No. 110.
Catalog Supplement, Raydot Total Ventilation Systems, "36 & 48 Series".
Catalog Supplement, Raydot Total Ventilation Systems, "Fiberglass Wall Fans".
Catalog Supplement, AAA Associates Inc., "New AAA Maxi-Brute Slanti-Wall Belt Drive Fans".
Catalog Supplement, Dynavent, "Portable Barn Fan".
Catalog Supplement, Dynavent, "Hay Drying Fans".
Catalog Supplement, Dynavent, "Portable Alley Fan".
Catalog Supplement Schaefer, "Flush-Mount Exhaust Fans".
Catalog Supplement, Schaefer, "36 Tunnel Ventilation Fan".
Endurance Wins Games, "Sports Mist" brochure.

* cited by examiner

COLLAPSIBLE MISTING FAN APPARATUS

BACKGROUND OF THE INVENTION

1. Field of the Invention

The present invention relates to an evaporative cooling apparatus and, more particularly, to a portable evaporative cooling apparatus that includes a standard food cooler chest and a quick release for removably mounting the fan of the cooling apparatus to the food cooler chest.

2. Background of the Invention

Evaporative coolers are used in a variety of settings including factories, warehouses, workshops and agricultural structures, as well as automobiles, homes, offices, trailers and at the sidelines of sporting events. Evaporative cooling improves workplace productivity by keeping workers cool in the workplace which, in turn, reduces heat-related illness and employee turn-over, particularly in the summer months and/or in hotter climates. It also improves performance of sports players by keeping players cool or preventing heat exhaustion in sports that demand extended periods of physical exertion.

Evaporative coolers require minimal parts and are relatively simple to manufacture and maintain, making them an attractive alternative to conventional air conditioning and mechanical refrigeration systems. Because of their simple construction, the cost of acquiring and operating evaporative coolers is considerably lower than that of conventional air conditioning systems. Moreover, evaporative coolers are especially useful in outside environments, whether open, such as an athletic field, or enclosed, for example, a factory or the like, whereas refrigeration systems in such environments are comparatively inefficient, if not impractical. Evaporative coolers are also economical since they use minimal amounts of energy and environmentally safe since they have no CFCs or HCFCs.

The versatility and other advantages of evaporative coolers have caused manufacturers to explore ways of making them more attractive to a wider range of consumers. One way of doing this is by making evaporative coolers more portable. Heretofore, attempts at improving portability have included, for example, reducing the size of and combining the components of the evaporative cooler into a smaller and more compact system. See, e.g., U.S. Pat. No. 2,769,620, which is illustrative of a typical portable evaporative cooler. Other attempts have included self-containing certain portions of the evaporative cooler, for example, by providing a water source that is remote from, or a separate component of, the evaporative cooler.

Yet another attempt to provide a portable evaporative cooling system is disclosed in U.S. Pat. No. 5,613,371 entitled, "Method and Apparatus for Misting Vehicle Occupants." The '371 patent integrates an evaporative cooling system into a golf cart having the fluid reservoir and other components integrated within the golf cart body. A disadvantage of the system disclosed in the '371 patent is the use of an accumulator system and accompanying solenoid valve. The accumulator is a device which traps air to store energy for supplying water under a substantially constant pressure. The accumulator therefore is implemented to reduce the pulsing of fluid to the mist nozzles caused by the pump. The inclusion of an accumulator and accompanying solenoid further increases the cost and complexity of the system and provides a potential reliability problem since the accumulator reservoir is often an inflatable diaphragm which may puncture or leak during the rugged operation of the golf cart. Alternatively, the accumulator reservoir is a rigid tank which disadvantageously increases the size of the system, making it difficult to incorporate the system into various types or vehicles or applications.

Another attempt to provide an evaporative cooler is illustrated by U.S. Pat. No. 6,182,463. The '463 patent discloses a portable evaporative cooling apparatus having a fan, a water pump, and a water cooler for storing the water. However, the '463 patent has certain disadvantages. First, because the apparatus as disclosed is designed to be mounted in the top opening of a round water cooler, it has a high center of gravity so that the device can easily be tipped over. Second, the fan is permanently mounted to the adapter that connects to the water cooler and therefore cannot be disconnected from the adapter for transport.

There is accordingly a need for an improved evaporative water cooler that addresses the deficiencies discussed above.

SUMMARY OF THE INVENTION

A portable, evaporative cooling apparatus, comprising:
(a) a cabinet for storing cooling water, the cabinet having an open top and a lid;
(b) a water pump attached to the cabinet for pumping cooling water out of the cabinet;
(c) a fan removably mounted on the lid and storable within the cabinet and
(d) a spraying system attached to the fan and to the water pump.

A principal object and advantage of the present invention is that the fan is removably mountable on the lid of a cooler cabinet by a quick release mechanism.

Another principle object and advantage of the present invention is that the fan can be stored within the cooler cabinet.

Another principle object and advantage of the present invention is that the apparatus has a low center of gravity and therefore has little tendency to tip over.

Another principle object and advantage of the present invention is that the cooler cabinet is mounted on wheels for easy transport.

DETAILED DESCRIPTION OF THE PREFERRED EMBODIMENT

Figure 1:
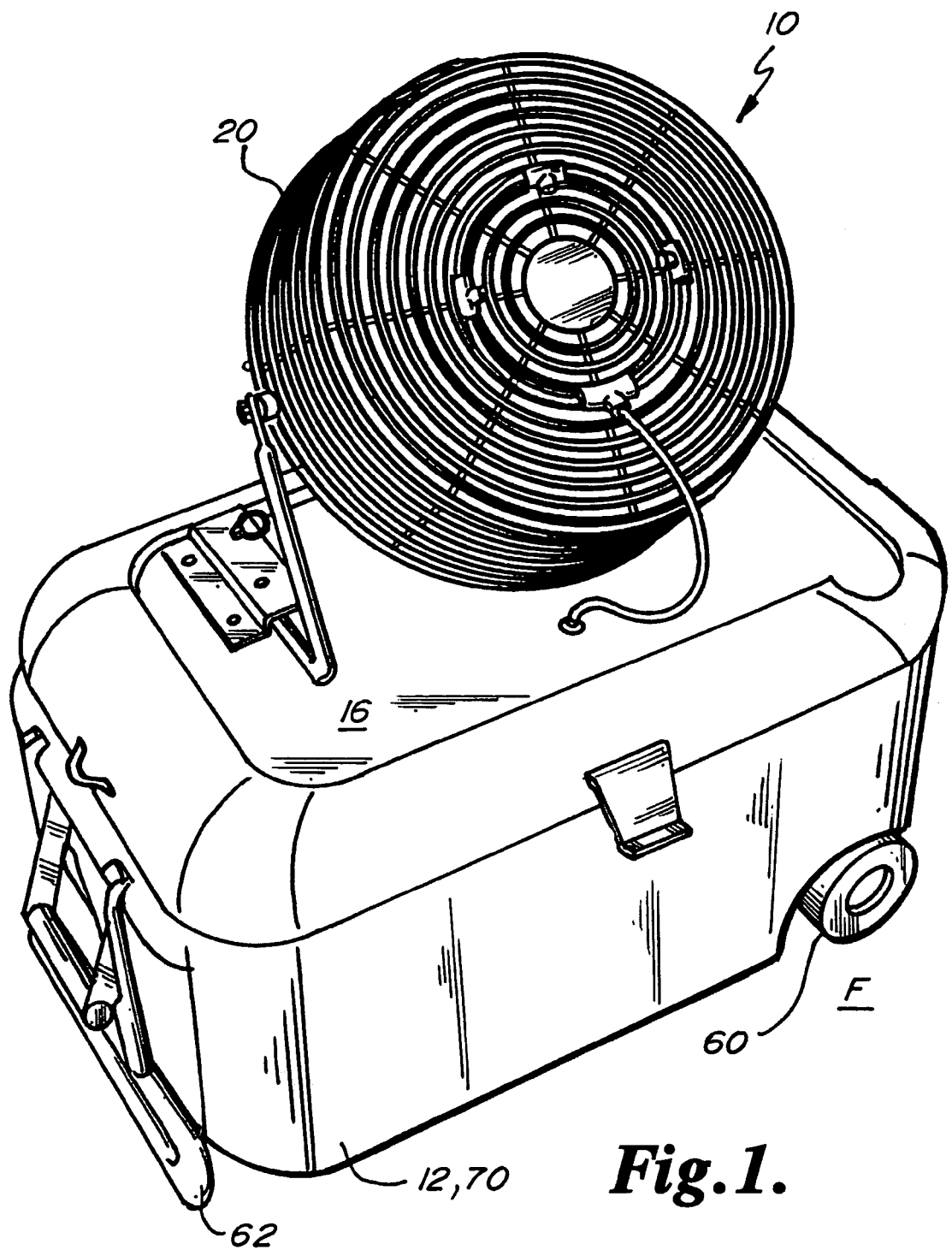
FIG. 1 is a front perspective view of the apparatus of the present invention.
Figure 2:
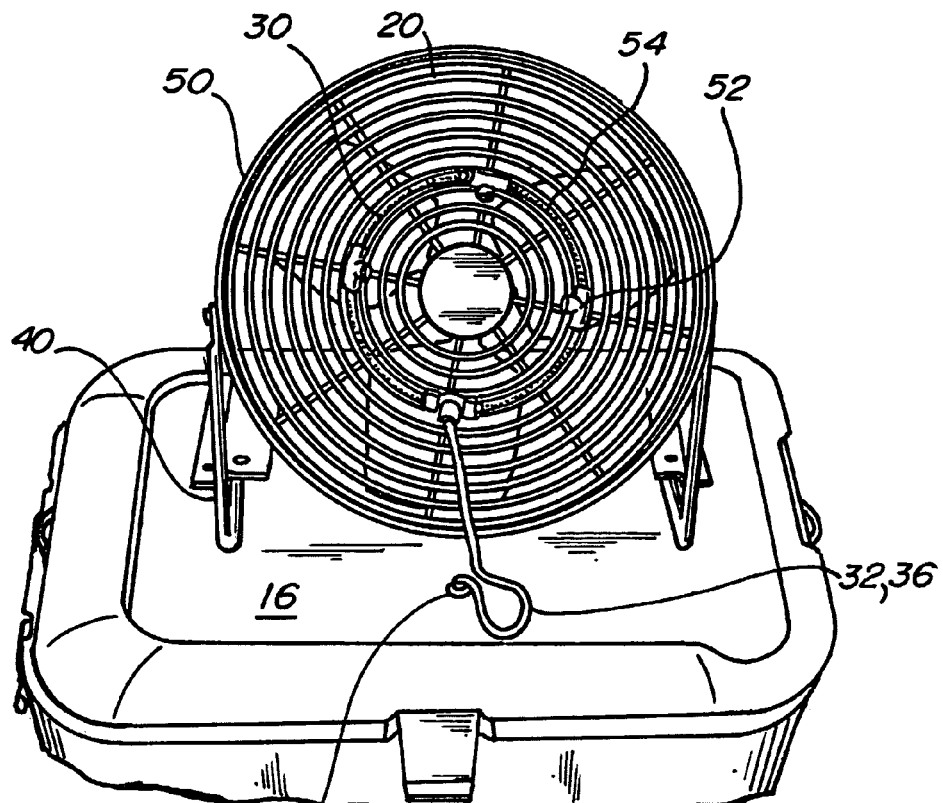
FIG. 2 is detailed perspective view of the apparatus of the present invention.
Figure 6:
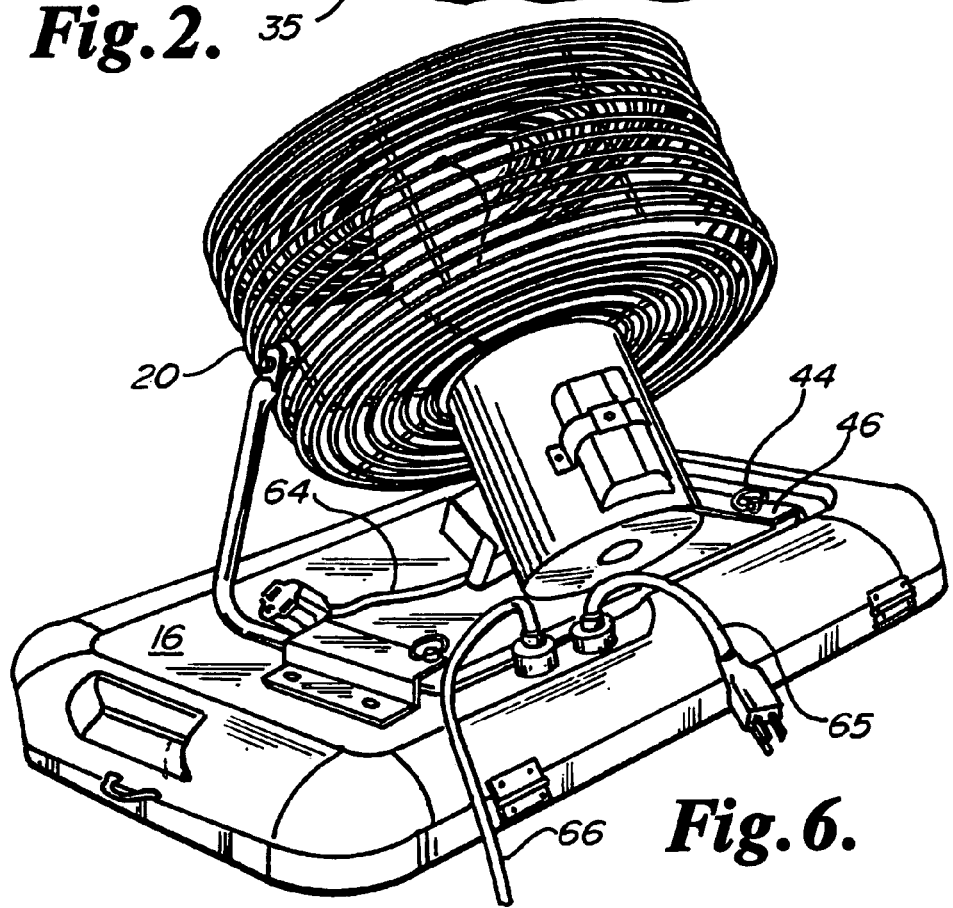
FIG. 6 is a perspective view of the apparatus of the present invention from the rear.
Figure 3:
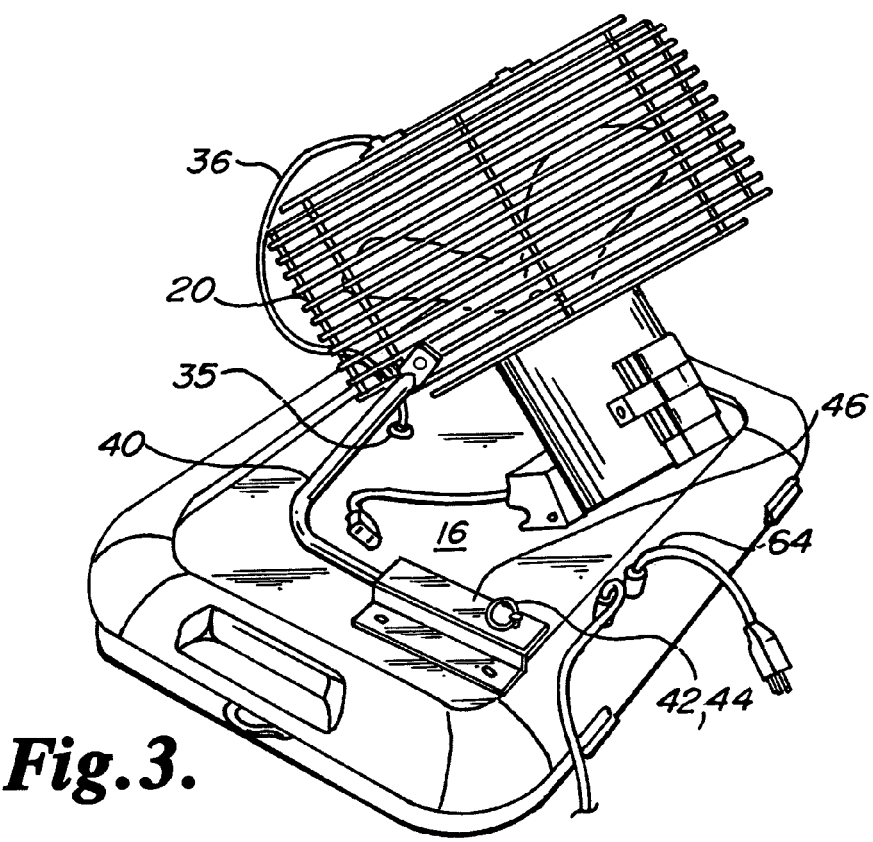
FIG. 3 is a side elevational view of the apparatus of the present invention.
Figure 5:
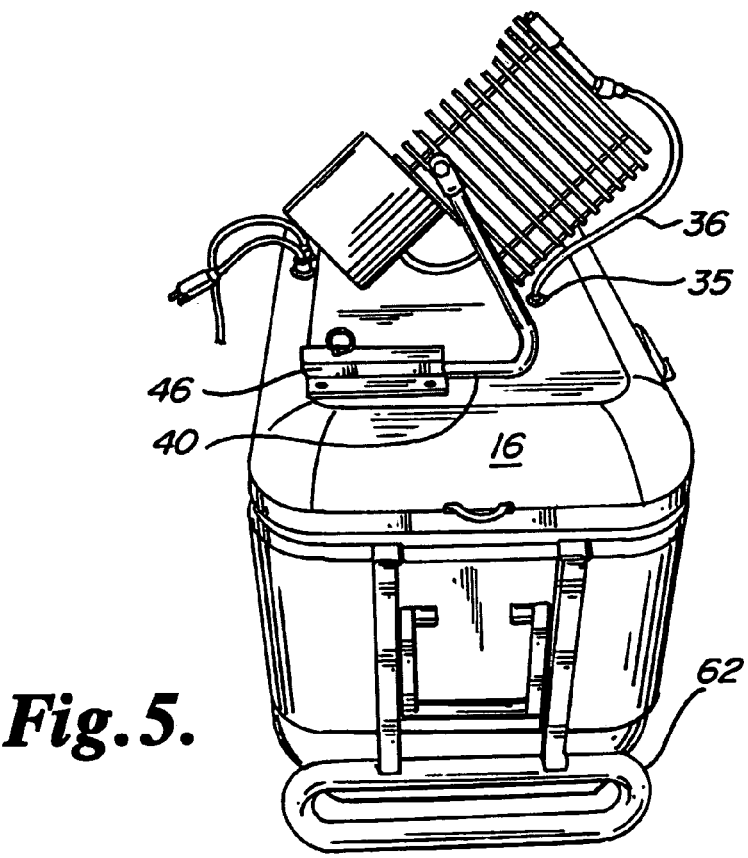
FIG. 5 is a perspective view of the apparatus of the present invention from the side.
Figure 4:
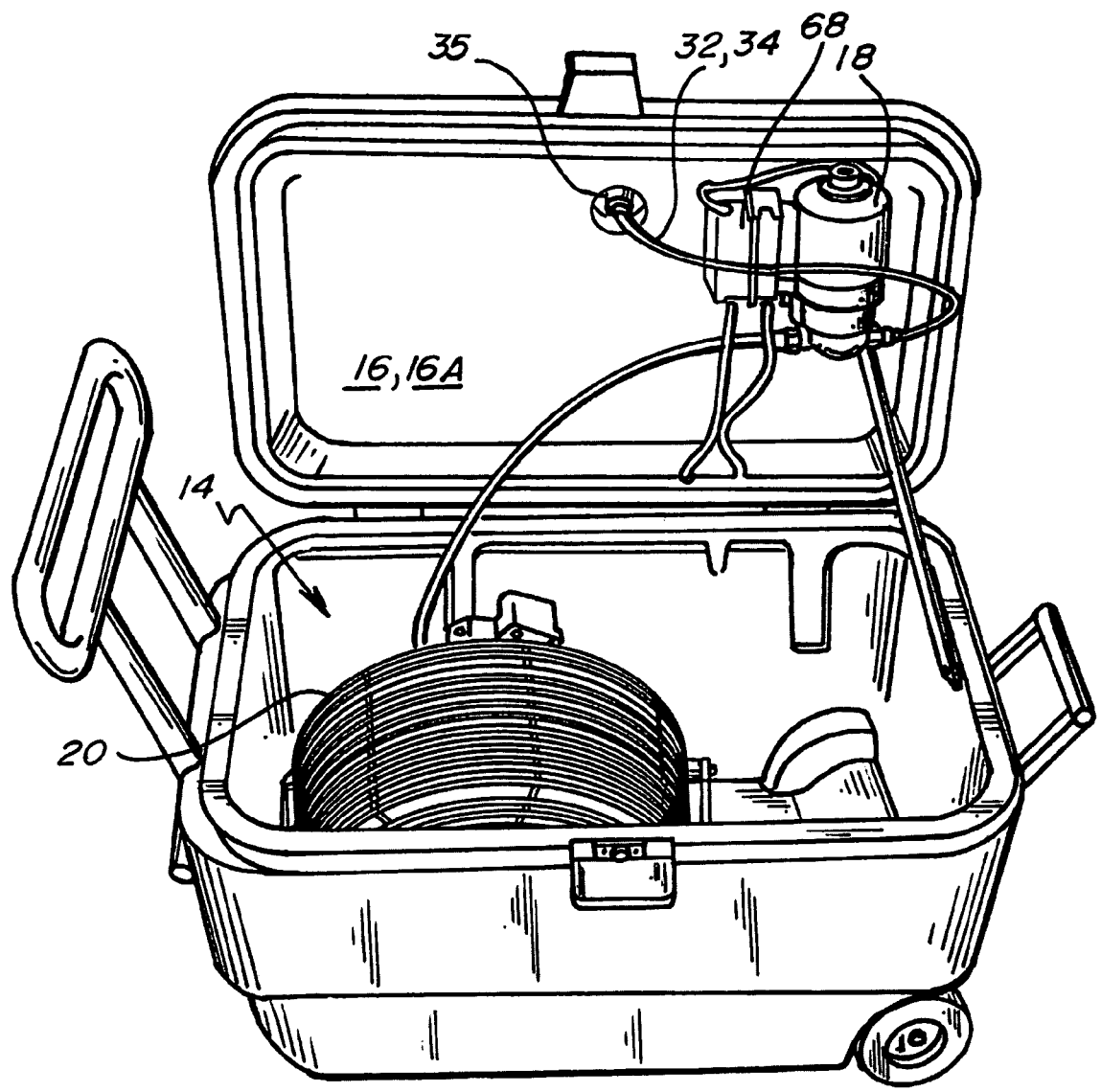
FIG. 4 is a perspective view of the interior of the apparatus of the present invention.

The portable, evaporative cooling apparatus of the present invention is generally shown in the Figures as reference numeral 10.

The apparatus 10 comprises a cabinet 12 for storing cooling water, the cabinet having an open top 14 and a lid 16. A water pump 18 is attached to the cabinet for pumping cooling water out of the cabinet. A fan 20 is removably mounted on the lid 16. When removed from the lid 16, the fan 20 may be stored within the cabinet 12. A spraying system 30 is attached to the fan and to the water pump.

Preferably, the water pump 18 is attached to the underside 16a of the lid 16 within the cabinet 12 and is connected to the spraying system 30 by a removable connection 32. Most preferably, the removable connection 32 comprises a first hose 34 from the water pump 18 to the lid 16, a connector 35 in the lid mating with the first hose 34, and a second hose 36 from the connector 35 to the spraying system 30. The second hose 36 is disconnectable from the connector 35.

Alternatively, the water pump 18 may be attached to the lid 16 at another location such as the outside of the lid 16. In such a case (not illustrated), the water pump 18 would draw water from the cabinet 12 by an appropriate connection and would in turn be connected to the spraying system 30 by a removable connection 32.

Preferably, the fan 20 has a base 40 which is attached to the lid 16 by a removable connection 42 between the base 40 and the lid 16. In the preferred embodiment, the removable connection 42 is a pin 44 that connects the base 40 to a mounting plate 46 on the lid 16.

Preferably, the fan 20 has a blade housing 50 enclosing the fan blades, and the spraying system 30 is mounted on the blade housing 50. Although the spraying system 30 is preferably mounted downstream from the air flow of the fan 20, it will be understood that it could also be mounted upstream from the air flow. In the preferred embodiment, the spraying system 30 comprises at least one misting nozzle 52 and a manifold 54 connecting the second hose 36 to the misting nozzle 52.

Preferably, the apparatus 10 further comprises at least one wheel 60 on the cabinet adapted to be rolled along a surface such as a floor F and a handle 62 adapted to pull the apparatus 10 as it is rolled along the surface F.

Preferably, the apparatus 10 further comprises an electrical plug 64 on the fan 20 and a mating electrical plug 65 on the lid 16. A power cord 66 connects to the water pump 18 through the lid 16 through a transformer 68 and also to the electrical plug 64.

It should be understood that the apparatus 10 can be retrofitted to a standard food cooler 70, the standard food cooler 70 comprising the cabinet 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A portable, evaporative cooling apparatus using cooling water, comprising:
   (a) a food cooler for storing cooling water, the food cooler having an open top and a lid, the lid having an inside and an outside;
   (b) a water pump mounted on the inside of the lid out of and away from the cooling water for pumping cooling water out of the food cooler;
   (c) a fan with a base removably secured directly to a mounting plate on the lid with a removable pin, and unobstructed access to the fan for facilitating removal of the fan from the lid and storage within the food cooler;
   (d) a spraying system attached to the fan and to the water pump; and
   (e) wherein the water pump stores within the food cooler, the fan removes for storage within the food cooler, the removable pin stores within the food cooler when not securing the fan with the base to the mounting plate, and the spray system stores within the food cooler.

2. The apparatus of claim 1, wherein the water pump further comprises a removable connection to the spraying system.

3. The apparatus of claim 2, wherein the removable connection further comprises a first hose from the water pump to the lid, a connector in the lid mating with the first hose, and a second hose from the connector in the lid to the spraying system, and wherein the second hose is disconnectable from the connector.

4. The apparatus of claim 1, the fan having a blade housing, and wherein the spraying system is mounted to the blade housing.

5. The apparatus of claim 4, wherein the spraying system further comprises at least one misting nozzle and a manifold.

6. The apparatus of claim 1, further comprising at least one wheel on the food cooler adapted to be rolled along a surface.

7. The apparatus of claim 6, further comprising a handle adapted to pull the food cooler as it is rolled along a surface.

8. The apparatus of claim 1, further comprising an electrical plug on the fan and a mating electrical plug on the lid.

9. The apparatus of claim 2, further comprising a power cord connecting to the water pump through the lid.

10. A portable, evaporative cooling apparatus using cooling water for retrofitting to a food cooler, the food cooler having a lid, the lid having an outside and an inside, the cooling apparatus comprising:
    (a) a water pump adapted to be attached inside of the lid of the food cooler out of and away from the cooling water for pumping cooling water out of the food cooler;
    (b) a fan with a base adapted to be removably directly secured to a mounting plate on the cooler lid with a removable pin, and an unobstructed access to the fan for facilitating removal of the fan from the lid, and adaptable to be storable within the food cooler;
    (c) a spraying system attached to the fan and to the water pump; and
    (d) wherein the water pump stores within the food cooler, the fan stores within the food cooler, the removable pin stores within the food cooler when not securing the fan with the base to the mounting bracket, and the spray system stores within the cooler.

11. The apparatus of claim 10, wherein the water pump further comprising a removable connection to the spraying system.

12. The apparatus of claim 11, wherein the removable connection further comprises a first hose from the water pump to the lid, a connector in the lid mating with the first hose, and a second hose from the connector in the lid to the spraying system, and wherein the second hose is disconnectable from the connector.

13. The apparatus of claim 10, the fan having a blade housing, and wherein the spraying system is mounted to the blade housing.

14. The apparatus of claim 13, wherein the spraying system further comprises at least one misting nozzle and a manifold.

15. The apparatus of claim 10, further comprising at least one wheel on the food cooler adapted to be rolled along a surface.

16. The apparatus of claim 15, further comprising a handle adapted to pull the food cooler as it is rolled along a surface.

17. The apparatus of claim 10, further comprising an electrical plug on the fan and a mating electrical plug on the lid.

18. The apparatus of claim 17, further comprising a power cord connecting to the water pump through the lid.

* * * * *